Nov. 5, 1946.     H. O. HEM     2,410,653
WEIGHING SCALE
Filed March 25, 1944     3 Sheets-Sheet 1
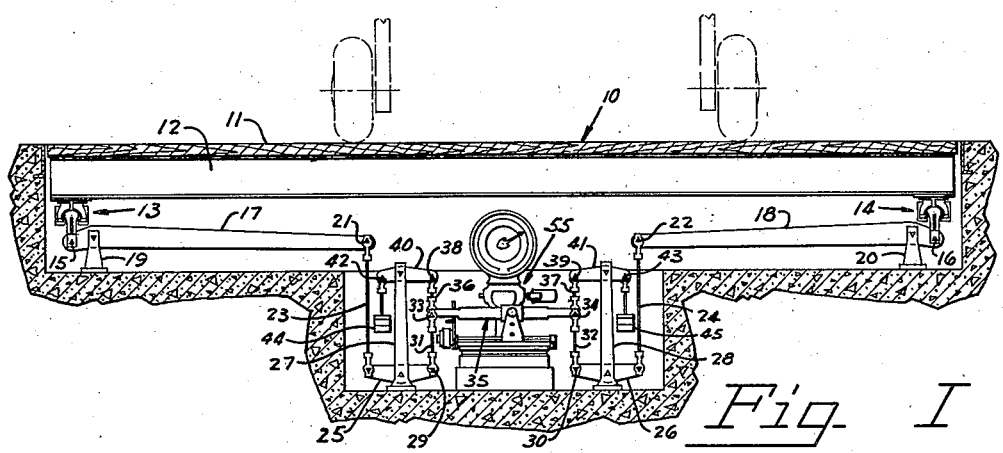
Fig. I
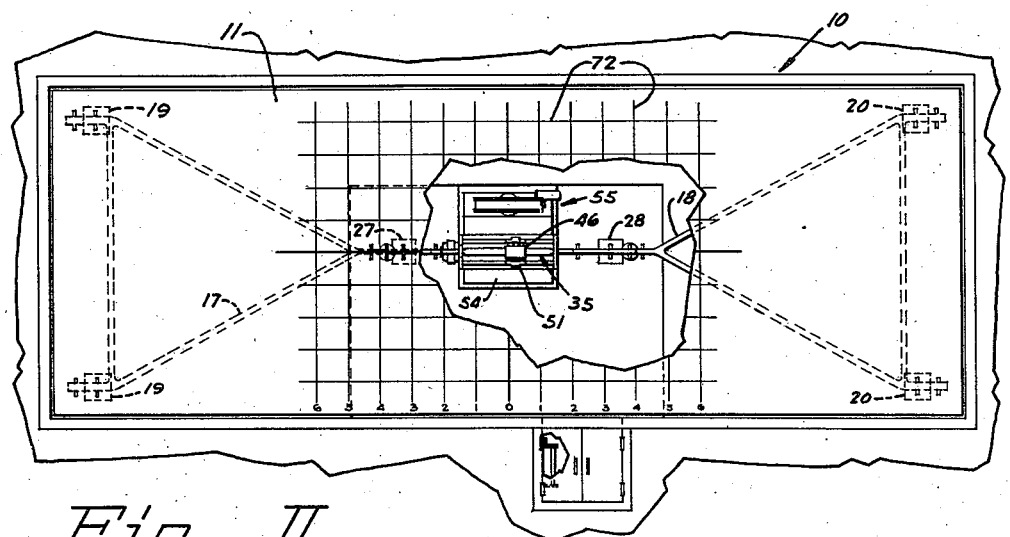
Fig. II
INVENTOR.
Halvor O. Hem
BY
Marshall & Marshall
ATTORNEYS

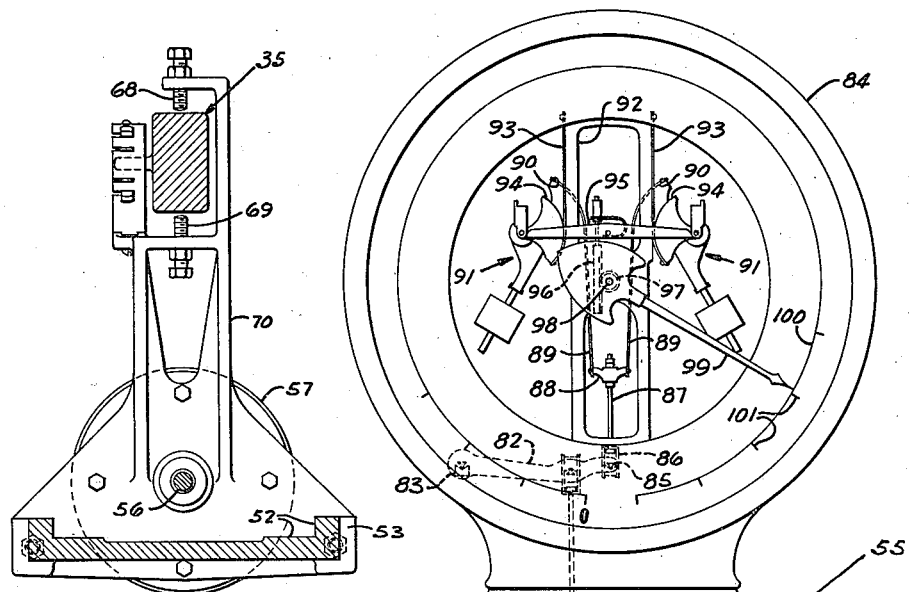
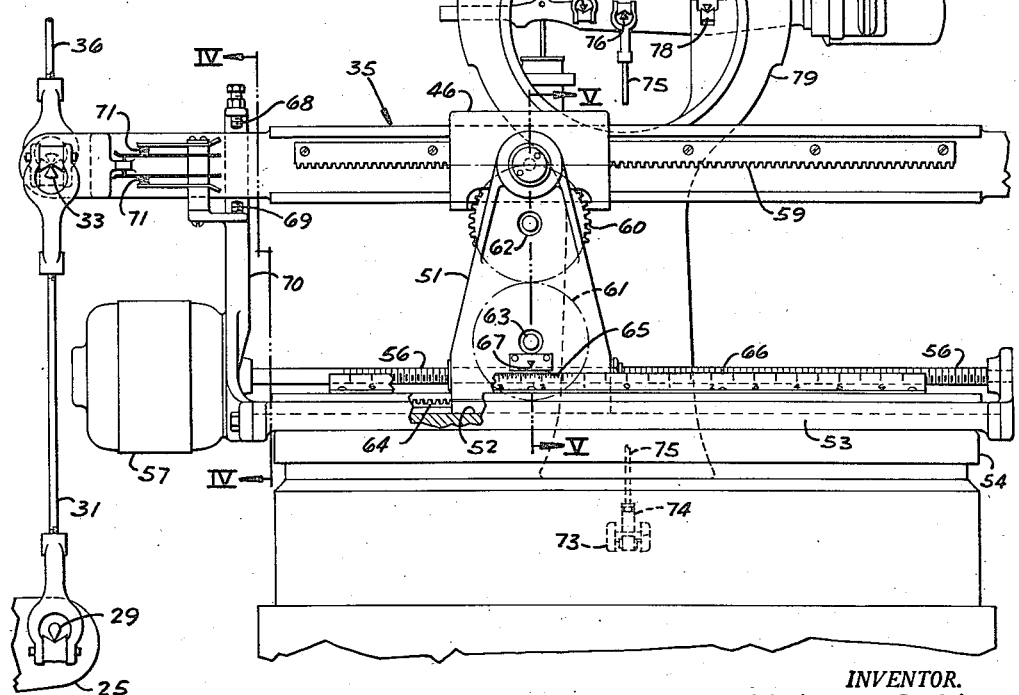

Nov. 5, 1946.  H. O. HEM  2,410,653
WEIGHING SCALE
Filed March 25, 1944  3 Sheets-Sheet 3
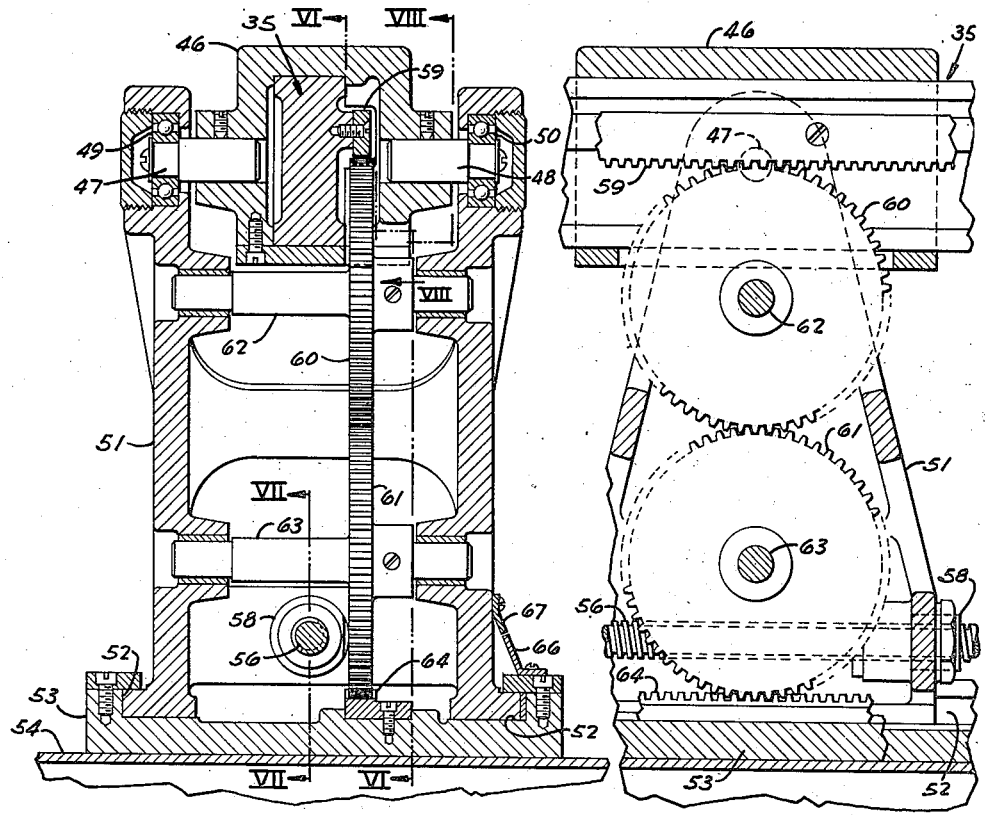
Fig. V  Fig. VI
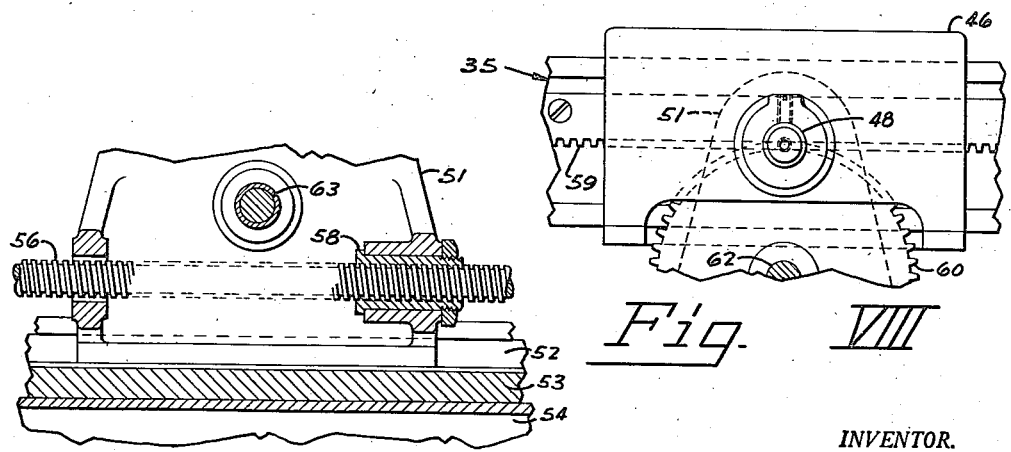
Fig. VII  Fig. VIII
INVENTOR.
Halvor O. Hem
BY
Marshall & Marshall
ATTORNEYS Patented Nov. 5, 1946

2,410,653

UNITED STATES PATENT OFFICE 2,410,653

WEIGHING SCALE

Halvor O. Hem, Toledo, Ohio, assignor to Toledo Scale Company, Toledo, Ohio, a corporation of New Jersey Application March 25, 1944, Serial No. 528,082

8 Claims. (Cl. 73—65)

This invention relates to weighing scales and in particular to a weighing scale adapted to automatically determine the horizontal projection of the center of gravity of a load placed thereon.

It has been customary when experimentally determining the center of gravity of an object to support the object on two or more scales and to calculate the position of the center of gravity from the distribution of weight as indicated by the several scales and the geometrical relationship of the points of contact of the object on the scales.

The object of this invention is to provide a single platform weighing scale which is adapted to automatically indicate the horizontal projection of a vertical plane containing the center of gravity of the load on the platform.

Another object of this invention is to provide a lever mechanism which will automatically indicate a ratio between two weights or forces.

More specific objects and advantages are apparent from the following description in which reference is made to the accompanying drawings.

In the drawings:

Figure I is an elevation of a weighing scale embodying the invention as installed in a pit. The front wall of the pit has been broken away to reveal the lever mechanism.

Figure II is a plan view of the scale shown in Figure I.

Figure III is an elevation at an enlarged scale of the load indicating mechanism and the load ratio determining levers.

Figure IV is a vertical section taken substantially along the line IV—IV of Figure III.

Figure V is a vertical section through the movable fulcrum traversing mechanism taken substantially along the line V—V of Figure III.

Figure VI is a vertical section of the traversing mechanism taken substantially along the line VI—VI of Figure V.

Figure VII is a vertical section taken substantially along the line VII—VII of Figure V.

Figure III is a fragmentary view of the movable fulcrum as seen from the line VIII—VIII of Figure V.

These specific drawings and the accompanying description merely illustrate a structure embodying the invention but do not define the limits of its adaptability or usefulness.

A load receiving platform 10 comprising a deck 11 secured to girders 12 is supported on parallel link suspensions 13 and 14 resting on load pivots 15 and 16 of substantially A-shaped main levers 17 and 18. The A-shaped levers 17 and 18 are of the first order and are fulcrumed on stands 19 and 20 respectively. Power pivots 21 and 22, located near the apexes of the A-shaped levers 17 and 18, transmit upward forces proportional to the loads supported by each end of the platform through connections 23 and 24 to reversing levers 25 and 26 fulcrumed near the bottom of stands 27 and 28. The downward pull of power pivots 29 and 30 of the reversing levers 25 and 26 respectively is transmitted through stirrup and link connections 31 and 32 to load pivots 33 and 34 of a floating lever 35. Other pivots, axially in line with the load pivots 33 and 34 of the floating lever 35, by means of connections 36 and 37 are pivotally connected to load pivots 38 and 39 mounted in counterbalancing levers 40 and 41. The counterbalancing levers 40 and 41, which are fulcrumed near the tops of stands 27 and 28, are of the first order and are provided with load pivots 42 and 43 carrying suspended counterweights 44 and 45.

The floating lever 35 through a greater portion of its length is machined to form a generally I-shaped cross section wherein the top and bottom flanges are parallel and of constant width. A saddle 46 is fitted around this I-shaped cross section and adapted to slide along its length. A pair of trunnions 47 and 48 extending laterally from the sides of the saddle 46 are carried in ball bearings 49 and 50 seated in horizontal bores near the top of a movable fulcrum stand 51 thus forming a movable fulcrum for the floating lever 35. The fulcrum stand 51 is mounted to slide in ways 52 provided in a base 53 extending substantially parallel to the floating lever 35. The base 53 is supported on a platform 54 of a conventional weighing scale 55.

The movable fulcrum stand 51 is driven along the base 53 by a lead screw 56 which is rotated by a motor 57 mounted at one end of the base 53. The lead screw 56 is journaled at each end of the base 53 and is threaded through a collar 58 secured in the fulcrum stand 51. The floating lever 35 is prevented from partaking of the motion of the fulcrum stand 51 by a rack and gear structure including a rack 59 mounted on the floating lever 35 with its pitch line lying in the pivot plane of the lever 35.

The rack 59 is operatively connected through a pair of gear wheels 60 and 61 mounted on horizontal shafts 62 and 63 to a rack 64 attached to the base 53. In this arrangement the motion of the fulcrum stand 51 with respect to the base 53 rotates the gears 61 and 60 and the rotation of the gear 60 drives the rack 59 and with it the floating lever 35 through the saddle 46 to maintain the position of the lever 35 with respect to the base 53. Because the pitch line of the rack 59 and the gear 60 lie in the pivot plane of the lever 35, which also includes the center line of the trunnions 47 and 48, the forces exerted between the rack 59 and the gear 60 do not materially affect the sensitivity of the lever 35. The ratio of the lever 35, as determined by the position of the saddle 46 containing the fulcrum for the lever 35, is indicated by indicia 65 inscribed on a scale 66 attached to the base 53. An index 67 mounted on the fulcrum stand 51 cooperates with the indicia 65.

Forces applied to the lever systems by loads placed on the platform 10 are divided according to the location of a load on the platform. Thus if the center of gravity of the load is disposed directly above the center of the platform the forces applied to the end levers 17 and 18 are equal. However, if the load is not so disposed and the center of gravity does not lie over the transverse center line of the platform the forces applied to the lever systems are inversely proportional to the distances between the horizontal projection of the center of gravity and the pivots 15 and 16. The forces from the load are transmitted through the lever systems to the floating lever 35 and tend to unbalance it as well as draw it downward. The downward force, proportional to the weight of the load, is transmitted through the fulcrum stand 51 and the base 53 to the weighing scale 55. The unbalance between the forces, as transmitted through the levers 17 and 18, caused by the center of gravity of the load being displaced from the center of the platform tends to rotate the lever 35 about its fulcrum in the stand 51. This rotation is limited by stops 68 and 69 mounted in a bracket 70 erected from the base 53. One or the other of a pair of electrical contacts 71, mounted on the bracket 70, are also closed depending upon the direction of rotation of the floating lever 35. These contacts control the motor 57 and cause it to rotate the lead screw thus moving the fulcrum stand 51 in such direction as to rebalance the floating lever 35. When such balance is attained the lengths of the segments of the floating lever 35 between its fulcrum and the pivots 33 and 34 are in direct proportion to the distances between the horizontal projection of the center of gravity of the load and the load pivots 15 and 16. For this to be true it is necessary that with no load on the platform 10 there shall be no forces either upward or downward between the floating lever 35 and its fulcrum. Therefore, the counterweights 44 and 45 are of such magnitude that they counterbalance the weight of the lever 35 and the forces due to the dead weight of the platform 10 and the lever systems. Thus the only force applied to the fulcrum stand 51, regardless of its position along the lever 35, is that produced by a load on the platform 10 and the ratio of the arms 35 to maintain equilibrium must be inversely proportional to the load carried by each end of the platform 10.

Indicia 72 inscribed upon the platform 10 are enlarged replicas of the indicia 65 on the scale 66 adjacent the path of travel of the fulcrum stand 51. The ratio of enlargement is the ratio of the length of the lever 35 to the span between the load pivots 15 and 16. Thus, the position of the fulcrum stand 51 as indicated on the scale 66 when transferred to the indicia 72 determines a vertical plane through the center of gravity of the load.

By rotating the load 90° with respect to the platform and rebalancing the lever 35 by moving the fulcrum stand 51, a second plane through the center of gravity of the load is determined. The intersection of these two planes defines a vertical line through the center of gravity of the load.

The total weight of the load exerts a downward force proportional to the load on the fulcrum stand 51 which is transmitted through the fulcrum stand, the base 53 and platform 54 to a supporting lever system (not shown) of the weighing scale 55. The force from the lever system is transmitted through a nose iron 73, a stirrup 74 and steelyard rod 75 to a load pivot 76 mounted in a tare beam lever 77 which is fulcrumed on bearings 78 mounted in an enlarged portion of a column 79 of the weighing scale 55. A power pivot 80 of the tare beam lever 77 is pivotally connected through a linkage 81 to a pendulum lever 82 fulcrumed in bearings 83 mounted on the inside surface of the rim of a substantially watchcase-shaped housing 84 surmounting the column 79. A power pivot 85 of the pendulum lever 82 is pivotally connected through a stirrup 86 and rod 87 to a yoke 88. From the arms of the yoke 88 a pair of flexible metallic ribbons extend upwardly and at their upper ends overlie and are attached to arcuate surfaces 90 of pendulum bodies 91. The pendulum bodies 91 are suspended from the sides of a pendulum frame 92 by other flexible metallic ribbons 93 attached to the upper end of the frame 92 and to the lower ends of arcuate surfaces 94 of the pendulum bodies 91. Because of the difference in radii of the arcuate surfaces 90 and 94, any downward forces applied to the ribbons 89 cause the pendulum bodies 91 to roll up the sides of the frame 92. This upward motion is transmitted through compensating bars 95 and rack 96 to a pinion 97 mounted on and rotating an indicator shaft 98 on which is mounted an indicator 99 adapted to sweep over an annular chart 100. The indicator 99 cooperates with indicia 101 printed on the annular chart 100 to indicate the magnitude of the load.

Thus the operator by merely reading the scale 66 and the position of the indicator 99 on the chart 100 has both the location of the vertical plane through the center of gravity and the weight of the object.

If it is desired to merely compare two forces, i. e. to obtain the ratio between them without determining their actual value, the weighing scale 55, the load receiving platform 10 and the lever systems between the load supporting platform 10 and the floating lever 35 may be eliminated thus leaving the floating lever 35, its fulcrum stand and means for moving it and the counterweights for carrying the weight of the lever 35. The forces are then applied to the ends of the lever 35 and the fulcrum stand moved to obtain equilibrium. When such equilibrium is obtained the segments of the lever 35, either side of its fulcrum, will be in inverse proportion to the forces applied to the ends of the lever. In this form this substructure may be used in numerous ways for maintaining or determining the ratio between unknown forces.

The structure disclosed may be modified to meet specific conditions without departing from the scope of the invention.

Having described the invention, I claim:

1. In a device of the class described, in combination, a load receiving platform, a separate lever system for supporting each end of said platform, a floating lever connecting said lever systems, a fulcrum for said floating lever mounted on and movable along a base parallel to said floating lever, a counterbalance for each of said lever systems for relieving said fulcrum of all forces exclusive of the force produced by a load on said platform, and means for moving said fulcrum to keep said floating lever in equilibrium.

2. In a device of the class described, in combination, a load receiving platform, a separate lever system for supporting each end of said platform, a floating lever connecting said lever systems, a fulcrum for said floating lever mounted on and movable along a base parallel to said floating lever, a counterbalance for each of said lever systems for relieving said fulcrum of all forces exclusive of the force produced by a load on said platform, means for moving said fulcrum to keep said floating lever in equilibrium, and means for indicating the position of said fulcrum.

3. In a device of the class described, in combination, a load receiving platform, a separate lever system for supporting each end of said platform, a floating lever connecting said lever systems, a fulcrum for said floating lever mounted on and movable along a base parallel to said floating lever, a counterbalance for each of said lever systems for relieving said fulcrum of all forces exclusive of the force produced by a load on said platform, automatic means for moving said fulcrum to keep said floating lever in equilibrium, and means for indicating the position of said fulcrum.

4. In a device for determining the ratio of two unknown forces, in combination, a lever to which said forces may be applied, a fulcrum for said lever mounted on and movable along a base parallel to said lever, means for counterbalancing the weight of said lever to relieve said fulcrum of all forces exclusive of the two forces to be compared, and means for moving said fulcrum along the base and indicating the ratio of the lengths of the arms of said lever.

5. In a device of the class described, in combination, a load receiving platform, a separate lever system for supporting each end of the platform, a floating lever connecting said lever systems, a base parallel to said floating lever, a fulcrum stand mounted on and movable along said base for transmitting forces from said floating lever to said base, counterbalancing means for each of said lever systems for relieving said fulcrum stand of all forces exclusive of those produced by a load on the platform, means for moving said fulcrum stand to vary the lengths of the arms of said floating lever, and a weighing scale supporting said base for indicating the force applied to said fulcrum stand.

6. In a device for indicating the sum and the ratio of two forces, in combination, a lever, pivotal means spaced apart along the length of the lever for applying the forces to the lever, means for counterbalancing the weight of the lever, said counterbalancing means allowing free translatory and rotary movement of the lever, a fulcrum for said lever movable along its length, weighing means supporting said fulcrum, and means for moving said fulcrum along said lever to vary the ratio of the lengths of the arms of said lever to maintain said lever in equilibrium.

7. In a device for indicating the sum and the ratio of two forces, in combination, a lever, pivotal means spaced apart along the length of the lever for applying the forces to the lever, a lever system and counterweights for supporting the weight of the lever, a fulcrum for said lever, automatic means for moving said fulcrum along the length of the lever in response to an unbalanced force tending to rotate said lever about said fulcrum, means for indicating the ratio of the arms of the lever, and means for indicating the force exerted by the lever against the fulcrum.

8. In a device for indicating the sum and the ratio of two forces, in combination, a lever, pivotal means spaced apart along the length of the lever for applying the forces to the lever, a lever system and counterweights for supporting the weight of the lever, a fulcrum for said lever, automatic means for moving said fulcrum along the length of the lever to vary the arms of the lever until the moments of the forces tending to rotate said lever are balanced, means for indicating the ratio of the arms of said lever and a weighing scale for supporting said fulcrum and indicating the force applied thereto by said lever.

HALVOR O. HEM.